United States Patent
Kim et al.

(10) Patent No.: US 12,027,749 B2
(45) Date of Patent: Jul. 2, 2024

(54) ANTENNA CLAMPING DEVICE

(71) Applicant: KMW INC., Hwaseong-si (KR)

(72) Inventors: In Ho Kim, Yongin-si (KR); Yong Hee Han, Osan-si (KR)

(73) Assignee: KMW INC., Hwaseong-si (KR)

( * ) Notice: Subject to any disclaimer, the term of this patent is extended or adjusted under 35 U.S.C. 154(b) by 72 days.

(21) Appl. No.: 17/717,018

(22) Filed: Apr. 8, 2022

(65) Prior Publication Data

US 2022/0238982 A1     Jul. 28, 2022

Related U.S. Application Data

(63) Continuation of application No. PCT/KR2020/014367, filed on Oct. 21, 2020.

(30) Foreign Application Priority Data

Oct. 25, 2019 (KR) .......... 10-2019-0133520
Dec. 18, 2019 (KR) .......... 10-2019-0169527

(51) Int. Cl.
*H01Q 1/12* (2006.01)
*F16M 13/02* (2006.01)
*H01Q 1/24* (2006.01)

(52) U.S. Cl.
CPC .......... *H01Q 1/1228* (2013.01); *F16M 13/02* (2013.01); *H01Q 1/246* (2013.01)

(58) Field of Classification Search
CPC ....... H01Q 1/1228; H01Q 1/246; F16M 13/02
See application file for complete search history.

(56) References Cited

U.S. PATENT DOCUMENTS 3,318,561 A * 5/1967 Finke .................. H01Q 1/1228
                                                   343/890
2011/0101184 A1   5/2011 Kirby et al.
(Continued)

FOREIGN PATENT DOCUMENTS

GB           846969 A      9/1960
GB          2170050 A      7/1986
(Continued)

OTHER PUBLICATIONS

International Search Report dated Jan. 27, 2021 for International Application No. PCT/KR2020/014367 and its English translation.
(Continued)

*Primary Examiner* — Anita M King
(74) *Attorney, Agent, or Firm* — Insight Law Group, PLLC; Seung Lee (57) ABSTRACT

The present invention relates to an antenna clamping device including an antenna clamping unit having a tip portion on which an antenna device is mounted, the antenna clamping unit being configured to perform at least any one of a tilting rotation and a rotating rotation to set directionality of the antenna device and having a rear end inserted and fixed into an opened upper end of the support pole, an insertion-type clamping unit disposed inside the opened upper end of the support pole and configured to mediate the fixed insertion of the antenna clamping unit, the insertion-type clamping unit being pressed and fixed to an inner peripheral surface of the support pole, and a support bracket unit fixedly disposed on an outer peripheral surface of the support pole and configured to fixedly support a lower end of the antenna clamping unit, thereby providing an advantage of improving workability for an onsite installer.

20 Claims, 11 Drawing Sheets

(56) References Cited

U.S. PATENT DOCUMENTS

| | | | |
|---|---|---|---|
| 2021/0408661 A1* | 12/2021 | Yoo | H01Q 1/246 |
| 2022/0029270 A1* | 1/2022 | Yoo | F16B 2/065 |
| 2022/0037758 A1* | 2/2022 | Kim | H01Q 3/08 |
| 2022/0123455 A1* | 4/2022 | Kang | H01Q 3/08 |
| 2022/0140466 A1* | 5/2022 | Kim | F16B 2/12 |
| | | | 343/702 |

FOREIGN PATENT DOCUMENTS

| | | |
|---|---|---|
| JP | H5-36911 U | 5/1993 |
| JP | 06-224616 A | 8/1994 |
| KR | 10-2004-0040000 A | 5/2004 |
| KR | 10-0892138 B1 | 4/2009 |
| KR | 10-2010-0084599 A | 7/2010 |
| KR | 10-1063936 B1 | 9/2011 |
| KR | 10-2015-0053570 A | 5/2015 |

OTHER PUBLICATIONS

Notice of Allowance dated Apr. 13, 2021 from Korean Intellectual Property Office for Korean Application No. 10-1019-0169527.
Notice of Allowance dated May 9, 2023 from the Japanese Patent Office for Japanese Application No. 2022-521214.
Extended European Search Report mailed on Feb. 12, 2024 from the European Patent Office for European Application No. 20879037.8.

* cited by examiner

ANTENNA CLAMPING DEVICE

CROSS-REFERENCE TO RELATED APPLICATIONS

This application is a Continuation of International Application No. PCT/KR2020/014367, filed on Oct. 21, 2020, which claims benefit of and priority to Korean Patent Application Nos. 10-2019-0133520, filed on Oct. 25, 2019; and 10-2019-0169527, filed on Dec. 18, 2019, the disclosure of which are herein incorporated by reference in their entirety.

TECHNICAL FIELD

The present invention relates to an antenna clamping device, and more particularly, to an antenna clamping device capable of simply inserting an antenna device having a comparatively heavy weight into and seating the antenna device onto an upper end of a support pole without a separate fixing device, thereby improving workability of an installer.

BACKGROUND ART

In general, as an example of wireless communication technologies, a multiple-input/multiple-output (MIMO) technology refers to a technology for innovatively increasing data transmission capacity by using a plurality of antennas. This technology uses a spatial multiplexing technique, in which a transmitter transmits different data through the respective transmission antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, if the number of antennas increases to ten, the channel capacity of about times is ensured by using the same frequency band in comparison with the current single antenna system.

Eight antennas are used in 4G LTE-advanced, and a product equipped with 64 or 128 antennas has been developed in a current pre-5G step. It is expected that base station equipment having a much larger number of antennas will be used in 5G, which refers to a massive MIMO technology. The current cell management is 2-dimension, but 3D-beamforming may be enabled when the massive MIMO technology is introduced, which also represents a full-dimension (FD) MIMO.

In the massive MIMO technology, the number of transmitters and the number of filters are increased as the number of antennas (ANTs) is increased. Nevertheless, because of cost of lease or spatial restriction in respect to an installation location, RF components (antennas, filters, power amplifiers, transceivers, etc.) need to be practically manufactured to be small in size, light in weight, and inexpensive, and the massive MIMO requires a high output to expand a coverage. However, electric power consumption and heat generation, which are caused by the high output, have a negative effect on reductions in weight and size.

In particular, to install the MIMO antenna, in which modules including RF elements and digital elements are coupled in a layered structure, in a limited space, there is a need for compact and miniaturized design of a plurality of layers constituting the MIMO antenna in order to maximize ease of installation or spatial utilization. Further, there is a strong need for free adjustment of directions of an antenna device installed on a single support pole.

DISCLOSURE

Technical Problem

The present invention has been made in an effort to provide an antenna clamping device capable of being seated directly on an opened upper end of a support pole and securely fixed to an internal space of an upper end of the support pole without a separate fixing device.

Technical Solution

An embodiment of an antenna clamping device according to the present invention includes: an antenna clamping unit having a tip portion on which an antenna device is mounted, the antenna clamping unit being configured to perform at least any one of a tilting rotation and a rotating rotation to set directionality of the antenna device and having a rear end fixedly inserted into an opened upper end of the support pole; an insertion-type clamping unit disposed inside the opened upper end of the support pole and configured to mediate the fixed insertion of the antenna clamping unit, the insertion-type clamping unit being pressed and fixed to an inner peripheral surface of the support pole; and a support bracket unit fixedly disposed on an outer peripheral surface of the support pole and configured to fixedly support a lower end of the antenna clamping unit.

In this case, the insertion-type clamping unit may include: a clamping body fixedly inserted into and caught by the opened upper end of the support pole and having a hollow internal space divided into an upper space and a lower space by a partition plate; a fixing bolt configured to penetrate the internal space of the clamping body in an upward/downward direction; and a pair of locking pressing pieces configured to fix the clamping body by pressing the inner peripheral surface of the support pole in conjunction with a rotational operation of the fixing bolt.

In addition, the insertion-type clamping unit may further include a fixing nut fitted with an outer peripheral surface of the fixing bolt and configured to rotate the fixing bolt over the upper and lower spaces of the clamping body upward or downward depending on a rotation direction thereof.

In addition, the fixing nut may be fitted with the outer peripheral surface of the fixing bolt positioned in the upper space, and the fixing nut may be supported on and fastened to an upper surface of the partition plate.

In addition, the pair of locking pressing pieces may be positioned in the lower space of the internal space of the clamping body, and a pair of through portions may be formed in the clamping body and opened so that the pair of locking pressing pieces moves in a horizontal direction and comes into contact with the inner peripheral surface of the support pole.

In addition, outer surfaces of the pair of locking pressing pieces, which are in contact with the inner peripheral surface of the support pole, may be serrated to increase a contact force.

In addition, the insertion-type clamping unit may further include a lift piece fitted with an outer periphery of a lower end of the fixing bolt positioned in the lower space of the internal space of the clamping body, the lift piece being configured to operate in conjunction with the fixing bolt.

In addition, the lift piece may be fitted with the outer periphery of the lower end of the fixing bolt positioned in the lower space of the internal space of the clamping body, and the lift piece may be supported and caught by a bolt head portion having a diameter relatively larger than a diameter of the fixing bolt.

In addition, an outer surface of the lift piece may be inclined upward, inner surfaces of the pair of locking pressing pieces may be inclined in parallel with the outer surface of the lift piece, and outer surfaces of the pair of locking pressing pieces may be formed as curved surfaces parallel to the inner peripheral surface of the support pole.

In addition, the lower space of the internal space of the clamping body may be shielded by a lower plate, and a pair of guide ribs may be provided on the lower plate and guide upward and downward movements of the lift piece that is moved upward or downward by a movement of the fixing bolt in the upward/downward direction.

In addition, upper surfaces of the pair of locking pressing pieces may be in close contact with a lower surface of the partition plate, lower surfaces of the pair of locking pressing pieces may be supported on an upper surface of the lower plate, and the pair of locking pressing pieces may be movable in a horizontal direction between the partition plate and the lower plate depending on an upward or downward movement of the lift piece.

In addition, a catching flange may be formed at an upper end of the clamping body and extend radially outward to have an outer diameter larger than an inner diameter of the upper end of the support pole, and a lower friction ring pad may be further provided on an upper surface of the catching flange and generate a frictional force with a part of a lower surface of the rear end of the antenna clamping unit.

In addition, an upper friction ring pad may be further provided at the rear end of the antenna clamping unit and generate a frictional force while being in surface contact with the lower friction ring pad of the clamping body.

In addition, a mounting shaft may be provided at the rear end of the antenna clamping unit and have a mounting groove recessed downward, and the antenna clamping unit may be fixed as the mounting shaft is inserted into the upper space of the internal space of the clamping body.

In addition, an upper end of the fixing bolt may be fastened inside the mounting groove by bolting while penetrating the mounting shaft.

In addition, a bolting fastening portion may be provided at the rear end of the antenna clamping unit and fastened to the support bracket unit by bolting.

In addition, the support bracket unit may include: a fastening plate disposed at one outer peripheral side of the support pole and elongated in an upward/downward direction; a U-shaped bolt configured to penetrate U-shaped bolt fastening holes formed in the fastening plate, the U-shaped bolt being coupled to the other outer periphery side of the support pole while surrounding the outer peripheral surface of the support pole; and a close-contact plate extending upward from the fastening plate and being in close contact with a bolting fastening portion of the antenna clamping unit.

In addition, the antenna clamping unit may be fixed by at least one fixing bolt that penetrates the close-contact plate and is fastened to the bolting fastening portion.

In addition, the fastening plate and the close-contact plate may be positioned at a position at which the bolting fastening portion and the close-contact plate face each other when the antenna clamping unit is inserted and supported in an internal space of the clamping body fixed to the upper end of the support pole.

Another embodiment of an antenna clamping device according to the present invention includes: an antenna clamping unit having a tip portion on which an antenna device is mounted, the antenna clamping unit being configured to perform at least any one of a tilting rotation and a rotating rotation to set directionality of the antenna device and having a rear end inserted and fixed into an opened upper end of the support pole; and an insertion-type clamping unit disposed inside the opened upper end of the support pole and configured to mediate the fixed insertion of the antenna clamping unit, the insertion-type clamping unit being pressed and fixed to an inner peripheral surface of the support pole, in which the insertion-type clamping unit includes: a clamping body fixedly inserted into and caught by the opened upper end of the support pole and having a hollow internal space divided into an upper space and a lower space by a partition plate; a fixing bolt configured to penetrate the internal space of the clamping body in an upward/downward direction; and a pair of locking pressing pieces configured to fix the clamping body by pressing the inner peripheral surface of the support pole in conjunction with a rotational operation of the fixing bolt.

Advantageous Effects

The embodiment of the antenna clamping device according to the present invention may achieve the following various effects.

First, the number of components for fixing the antenna clamping unit is significantly reduced in comparison with the related art, which makes it possible to reduce costs.

Second, the insertion-type clamping unit is positioned in the internal space of the support pole to fix the antenna clamping unit, which makes it possible to prevent deterioration in aesthetic external appearance.

Third, it is possible to easily perform the process of installing the antenna clamping unit and the antenna device which are comparatively heavy in weight.

DESCRIPTION OF MAIN REFERENCE NUMERALS OF DRAWINGS

1: Support pole
1*a*: Upper-end opening portion
10: Antenna clamping unit
11: Tilting unit
12: Rotation unit
13: Coupling unit
15: Rear end
16: Mounting groove
17: Mounting shaft
18: Bolting fastening portion
19: Bolt fastening hole
20: Upper friction ring pad
21: Flat-head threaded member
50: Support bracket unit
51: Fastening plate
52 U-shaped bolt fastening hole
53: U-shaped bolt
54: U-shaped bolt fastening nut
55: Elastic washer
56: Close-contact plate
57: Bolt through-hole
58: Fixing bolt
100: Insertion-type clamping unit
110: Clamping body
115: Through portion
120: Partition plate
125: Catching flange
130: Lower plate
131: Guide rib
140: Fixing bolt
145: Bolt head portion
150: Fixing nut
160: Fixing washer
170: Lift piece
180*a*, 180*b*: Locking pressing piece
190: Screw fastening hole
200: Lower friction ring pad
210: Flat-head threaded member

BEST MODE

Hereinafter, embodiments of an antenna clamping device according to the present invention will be described in detail with reference to the accompanying drawings. In assigning reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of publicly known related configurations or functions incorporated herein will be omitted when it is determined that the detailed description obscures the subject matters of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

Figure 1:
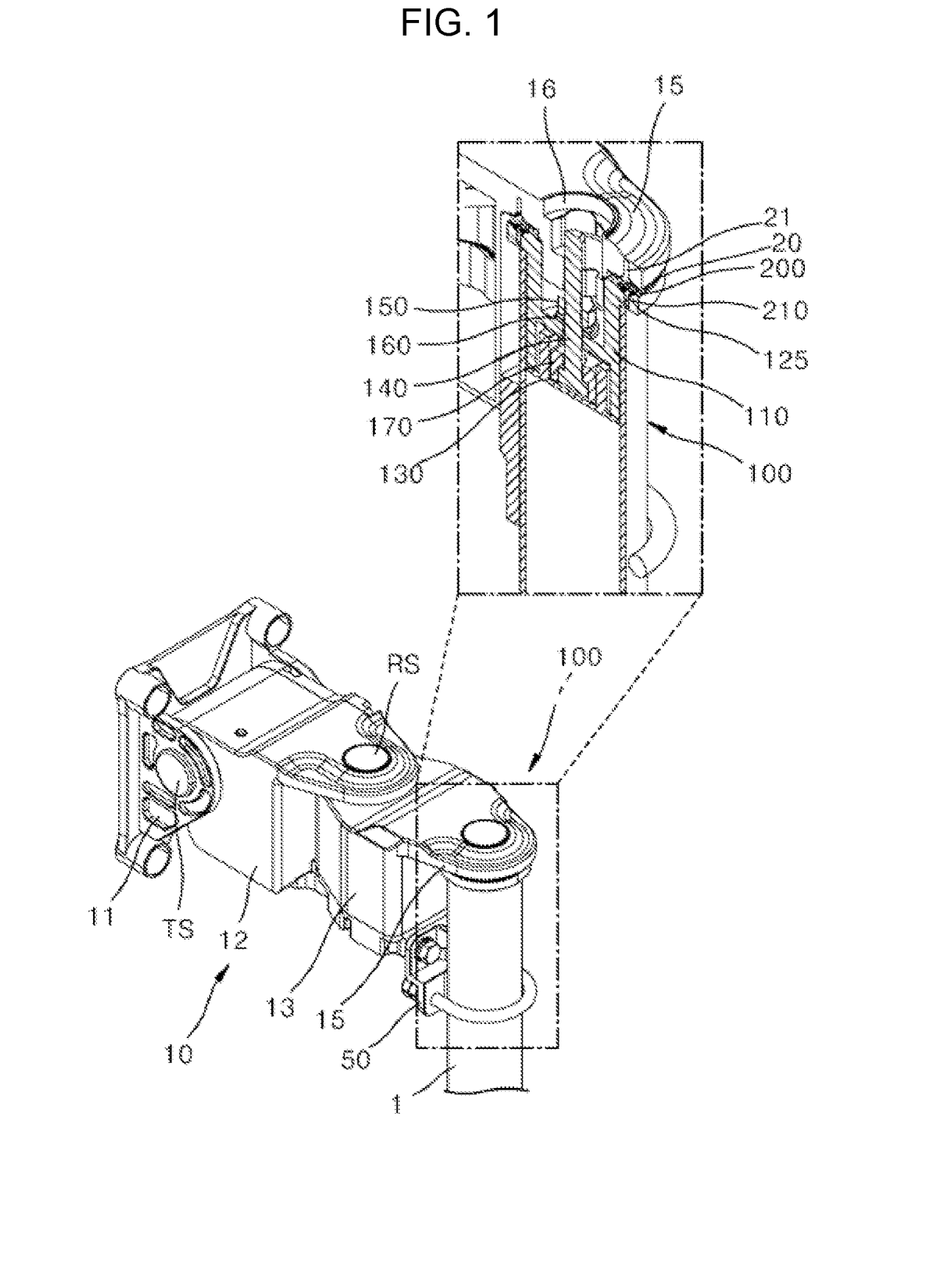
FIG. 1 is a perspective view illustrating an antenna clamping device according to an embodiment of the present invention and a partially cut-away perspective view.
Figure 2:
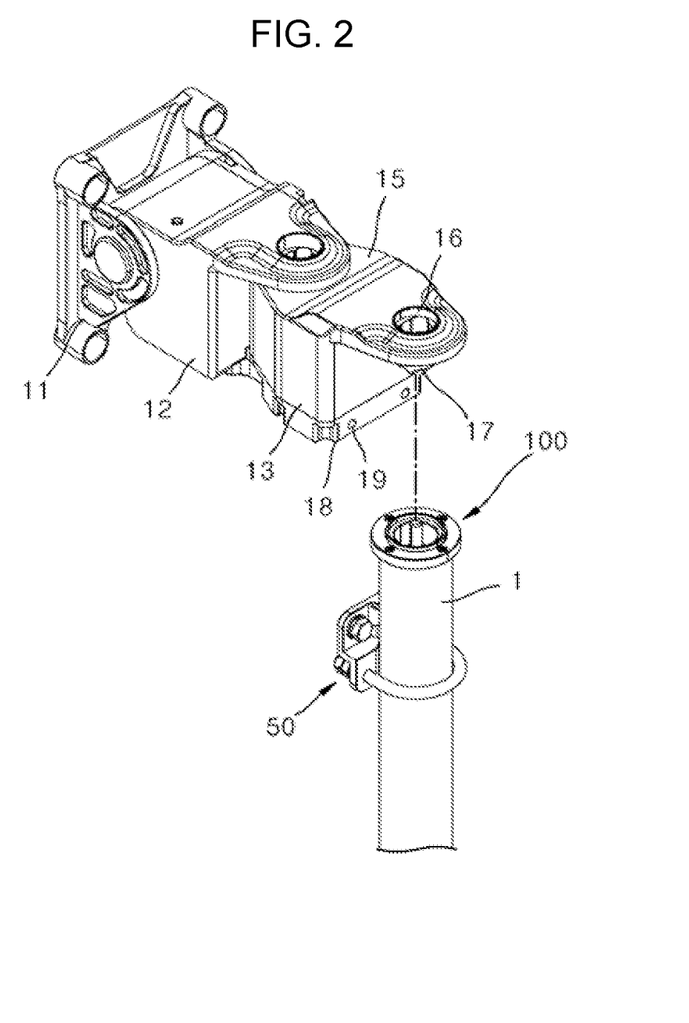
FIG. 2 is an exploded perspective view of FIG. 1.

FIG. 1 is a perspective view illustrating an antenna clamping device according to an embodiment of the present invention and a partially cut-away perspective view, and FIG. 2 is an exploded perspective view of FIG. 1.

As illustrated in FIGS. 1 and 2, an antenna clamping device according to an embodiment of the present invention includes: an antenna clamping unit 10 having a tip portion on which a non-illustrated antenna device is mounted, the antenna clamping unit 10 being configured to perform any one of a tilting rotation and a rotating rotation to set directionality of the antenna device; an insertion-type clamping unit 100 configured to mediate the fixed insertion of the antenna clamping unit 10 into an upper end of a support pole 1; and a support bracket unit 50 configured to fixedly support a lower end of the antenna clamping unit 10.

The antenna clamping unit 10 serves to substantially mediate the mounting of the antenna device. As illustrated in FIGS. 1 and 2, the antenna clamping unit 10 may perform any one of the tilting rotation and the rotating rotation to set the directionality of the antenna device.

More specifically, the antenna clamping unit 10 may include: a tilting unit 11 having a front end on which the antenna device is installed, the tilting unit 11 being configured to perform a tilting rotation about a tilting shaft TS by a predetermined angle in an upward/downward direction in a state in which the antenna device is installed; a rotation unit 12 coupled to a rear end of the tilting unit 11, the rotation unit 12 being configured to rotate the antenna device about a rotating shaft RS by a predetermined angle in a leftward/rightward direction; and a coupling unit 13 coupled to a rear end of the rotation unit 12, the coupling unit 13 configured to mediate the fixed insertion into the support pole 1.

That is, the directionality of the antenna device mounted on the antenna clamping unit 10 may be adjusted as the antenna device is tilted in the upward/downward direction by the tilting unit 11, and the directionality of the antenna device may be also adjusted as the antenna device is rotated in the leftward/rightward direction by the rotation unit 12, which makes it possible to further improve reliability related to signal quality of the antenna device.

As illustrated in FIGS. 1 and 2, in the configuration of the antenna clamping unit 10, an upper portion of a rear end 15 of the coupling unit 13 may extend horizontally toward the upper end of the support pole 1, and a mounting shaft 17 may be formed at the extending rear end 15 of the coupling unit 13 and have a mounting groove 16 extending and recessed downward.

The mounting shaft 17 of the coupling unit 13 may be inserted and seated in an upper space of an internal space of the insertion-type clamping unit 100 installed on an upper-end opening portion of the support pole 1. An upper end of a fixing bolt 140 of the insertion-type clamping unit 100, which is exposed upward while penetrating the mounting groove 16 and will be described below, may be fastened and fixed by a non-illustrated fastening nut. Further, the mounting shaft 17 of the coupling unit 13 may be sized to be matched in shape with the upper space of the internal space of the insertion-type clamping unit 100, thereby preventing an overall clearance (or sway) of the antenna clamping unit 10 fixedly seated on the insertion-type clamping unit 100.

Further, as illustrated in FIGS. 1 and 2, a bolting fastening portion 18 may be provided at a lower side of a rear end of the coupling unit 13 and fixedly fastened and brought into contact with the support bracket unit 50 to be described below. One or more bolt fastening holes 19 may be formed in the bolting fastening portion 18. Fixing bolts 58 of the support bracket unit 50 may be penetratively fastened to the bolt fastening holes 19 of the bolting fastening portion 18, such that the bolting fastening portion 18 formed at the rear end of the coupling unit 13 of the antenna clamping unit 10 may be coupled.

As illustrated in FIGS. 1 and 2, the insertion-type clamping unit 100 serves to mediate the coupling of the antenna clamping unit 10 so that the antenna clamping unit 10 may be securely fixed by being mounted in the form of a single beam on the upper end of the support pole 1.

Although not illustrated in the drawings, typically, a separate mounting bracket or mounting arm is mounted first to surround an outer peripheral surface of the support pole 1, and then the antenna clamping unit 10 is coupled to the mounting bracket or mounting arm. However, the mounting bracket or mounting arm is exposed to the outside of the support pole 1, which degrades an aesthetic external appearance of the support pole 1 on which the antenna device is installed. For this reason, a combination of complicated and rigid components is needed to support the antenna clamping unit 10 and the antenna device, which are comparatively heavy in weight, in a gravitational direction. According to the antenna clamping device according to the embodiment of the present invention, the number of components, which may degrade the aesthetic external appearance of the support pole 1, may be minimized, some of the components capable of fixedly supporting the antenna clamping unit 10 may be hidden in the upper-end opening portion of the support pole 1, and the more secure support structure may be implemented.

That is, as illustrated in FIGS. 1 and 2, in the antenna clamping device according to the embodiment of the present invention, only the support bracket unit 50, which is simply configured to prevent a clearance (sway) of the antenna clamping unit 10 in a leftward/rightward direction, is installed on an outer peripheral surface of the support pole 1 spaced apart downward by a predetermined distance from the upper end of the support pole 1. In addition, the insertion-type clamping unit 100 is embedded in the upper-end opening portion of the support pole 1 and mediates the connection with and fixing of the antenna clamping unit 10. In this case, the antenna clamping unit 10 may be securely fixed by the support bracket unit 50 after the rear end 15 of the coupling unit 13 is simply and fixedly seated onto the upper end of the insertion-type clamping unit 100.

Figure 3:
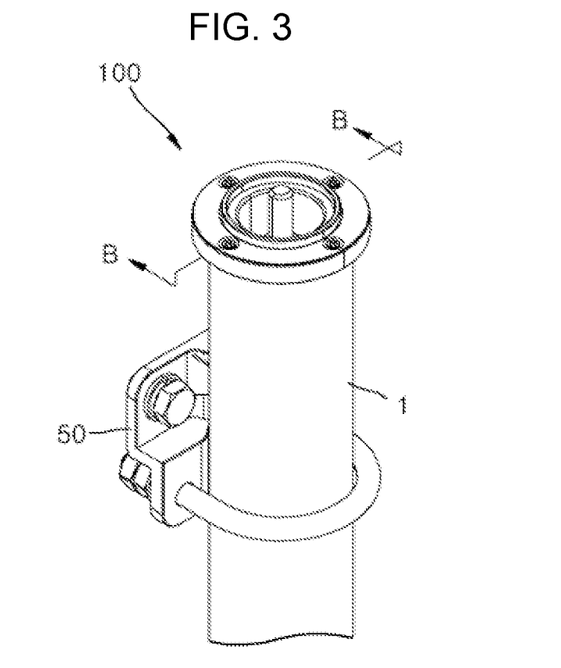
FIG. 3 is a perspective view illustrating a state in which an insertion-type clamping unit and a support bracket unit among the components illustrated in FIG. 1 are installed on a support pole.
Figure 4:
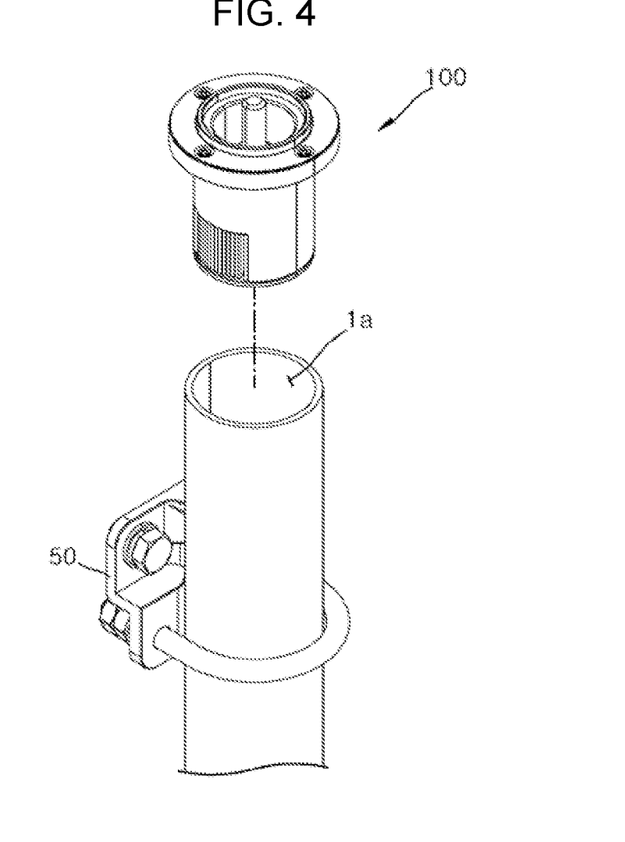
FIG. 4 is an exploded perspective view illustrating a state in which the insertion-type clamping unit among the components illustrated in FIG. 3 is installed.
Figure 5:
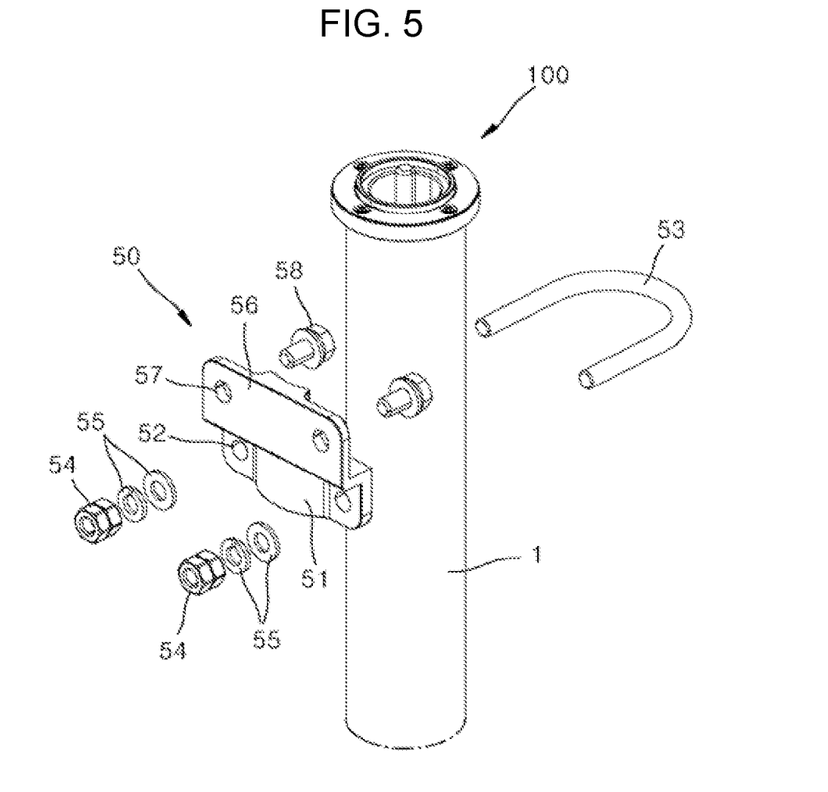
FIG. 5 is an exploded perspective view illustrating a state in which the support bracket unit among the components illustrated in FIG. 3 is installed.

FIG. 3 is a perspective view illustrating a state in which the insertion-type clamping unit and the support bracket unit among the components illustrated in FIG. 1 are installed on the support pole, FIG. 4 is an exploded perspective view illustrating a state in which the insertion-type clamping unit among the components illustrated in FIG. 3 is installed, and FIG. 5 is an exploded perspective view illustrating a state in which the support bracket unit among the components illustrated in FIG. 3 is installed.

As illustrated in FIGS. 3 and 4, in the embodiment of the antenna clamping device according to the present invention, the insertion-type clamping unit 100 may be fixedly inserted into the upper-end opening portion of the support pole 1 before the antenna clamping unit 10 is fixed to the support pole 1. Then, the support bracket unit 50 may be temporarily fixed to the outer peripheral surface of the support pole 1 spaced apart downward by a predetermined distance from the upper end of the support pole 1.

In this case, as illustrated in FIG. 5, the support bracket unit 50 may include a fastening plate 51 disposed at one outer peripheral side of the support pole 1 and elongated in an upward/downward direction, a U-shaped bolt 53 disposed at the other outer periphery side of the support pole 1 and coupled to surround the outer peripheral surface of the support pole 1 while penetrating U-shaped bolt fastening holes 52 formed in the fastening plate 51, and a close-contact plate 56 extending upward from the fastening plate 51 and configured to come into close contact with the bolting fastening portion 18 of the antenna clamping unit 10.

The fastening plate 51 may include a rounded curved surface shape being approximately in close contact with the outer peripheral surface of the support pole 1. The fastening plate 51 may have the U-shaped bolt fastening holes disposed at one side and the other side thereof and penetrated by tip portions of the U-shaped bolt 53.

The tip portions of the U-shaped bolt 53, which penetrate the U-shaped bolt fastening holes 52, are securely fastened by U-shaped bolt fastening nuts 54 with elastic washers 55 interposed between a front surface of the fastening plate 51 and the U-shaped bolt fastening nuts 54. The U-shaped bolt 53 may be securely fixed to the outer peripheral surface of the support pole 1 by a tightening force of the U-shaped bolt fastening nuts 54.

The close-contact plate 56 is bent and extends upward from the fastening plate 51. However, the close-contact plate 56 may not be necessarily bent and extend upward but extend downward. Further, bolt through-holes 57 may be formed through the close-contact plate 56 in a forward/rearward direction. The rear end of the coupling unit 13 of the antenna clamping unit 10 may be securely fixed into the bolt through-holes 57 formed in the close-contact plate 56 as the fixing bolts 58 penetrate the bolt through-holes 57 from rearward of the close-contact plate 56 and are fastened to the bolt fastening holes 19 of the bolting fastening portion 18 formed at the rear end of the coupling unit 13 of the components of the antenna clamping unit 10.

In this case, as illustrated in FIGS. 1 and 2, the fastening plate 51 and the close-contact plate 56 may be positioned at a position at which the bolting fastening portion 18 and the close-contact plate 56 face each other when the antenna clamping unit 10 is inserted and supported in the upper space of the internal space of a clamping body 110 of the insertion-type clamping unit 100 fixed to the upper end of the support pole 1.

Figure 6A:
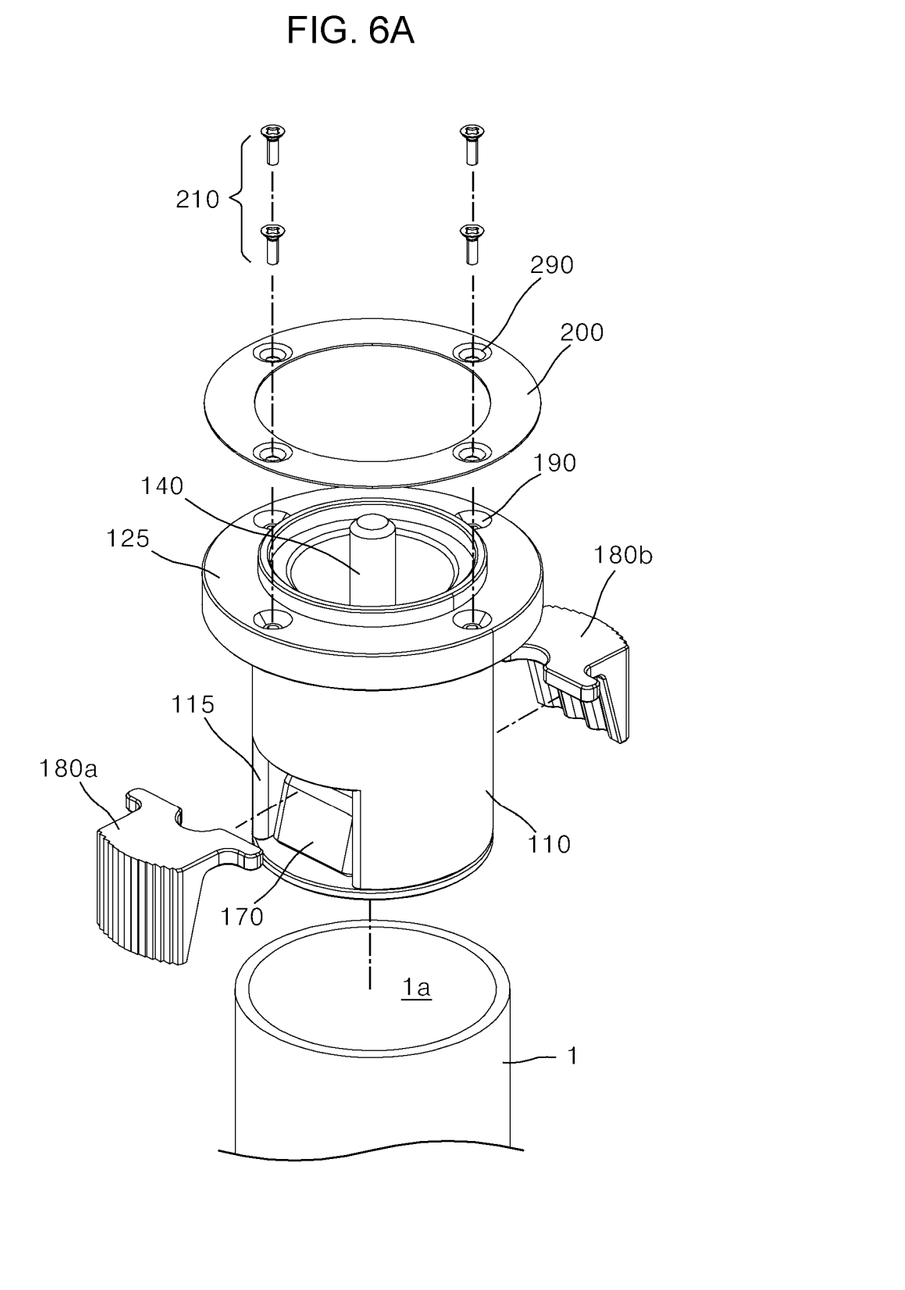
FIGS. 6A and 6B are exploded perspective views illustrating an external configuration and an internal configuration of the insertion-type clamping unit among the components illustrated in FIG. 3.
Figure 6B:
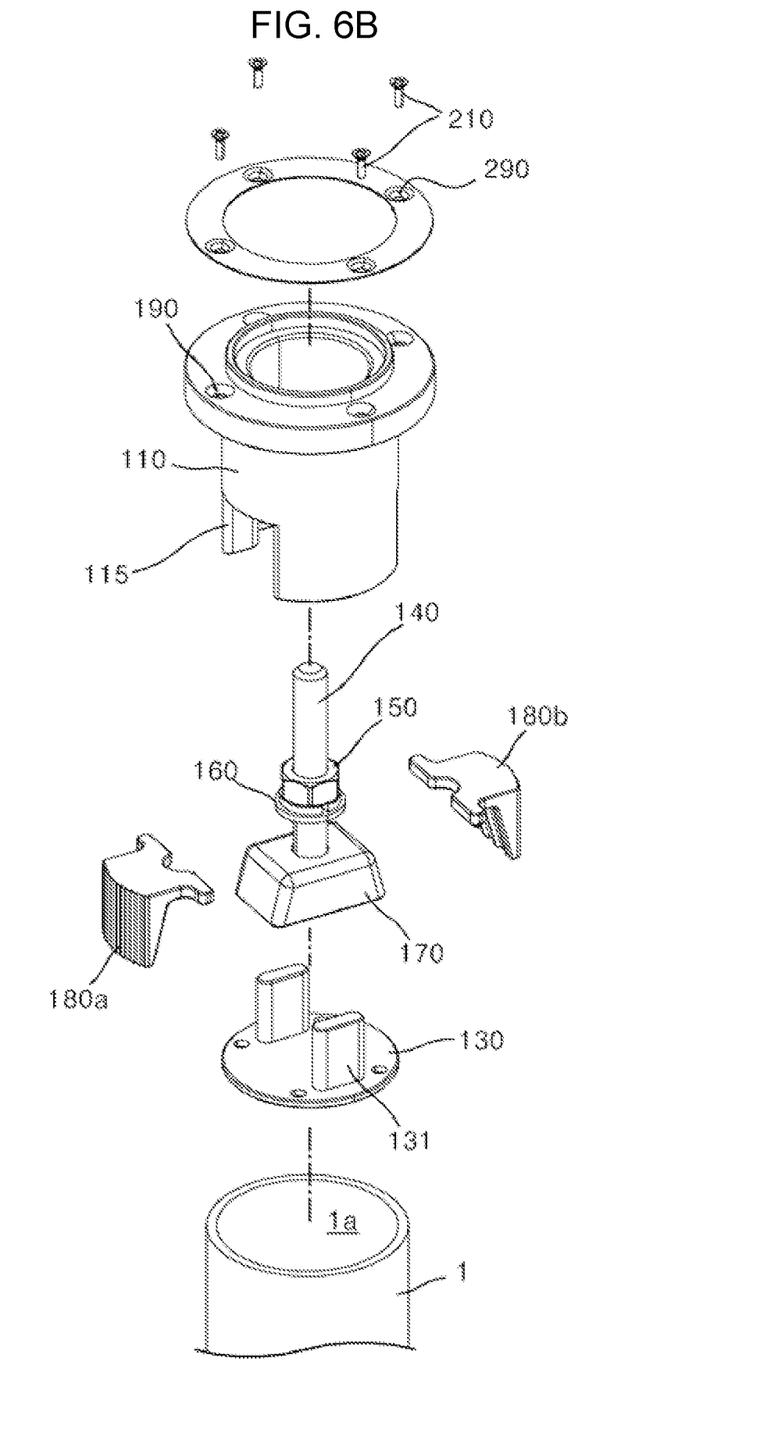
Figure 7:
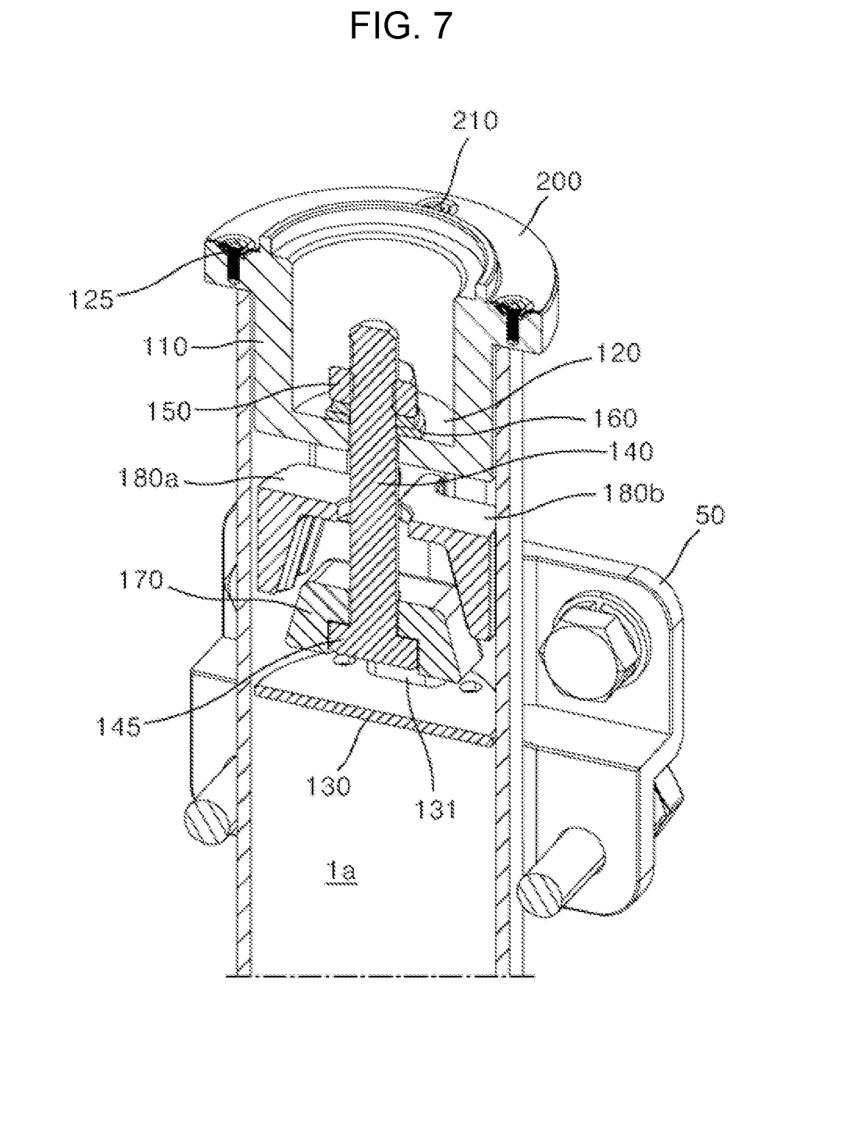
FIG. 7 is a cut-away perspective view taken along line B-B in FIG. 3.
Figure 8:
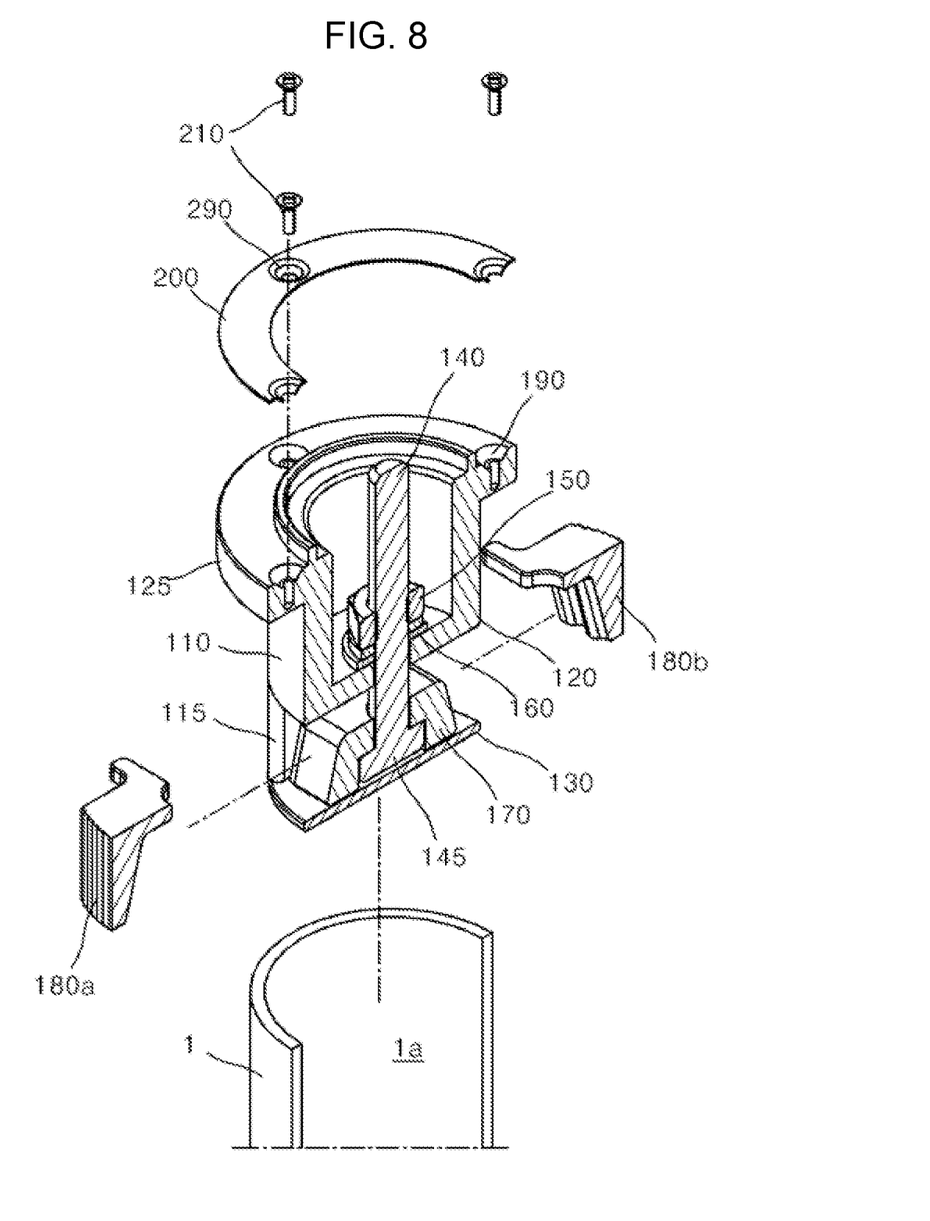
FIG. 8 is a cut-away perspective view taken along line B-B in FIG. 3, i.e., an exploded perspective view of the configuration disposed outside the support pole.
Figure 9A:
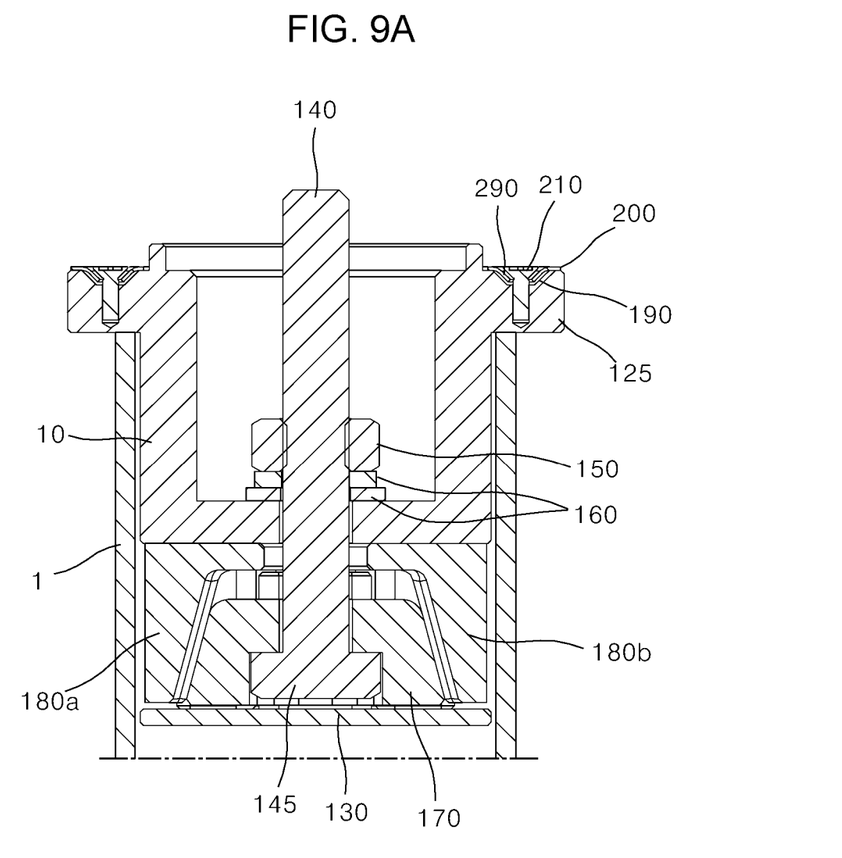
FIGS. 9A and 9B are cross-sectional views illustrating states in which a locking pressing piece among the components of the insertion-type clamping unit illustrated in FIG. 3 operates.
Figure 9B:
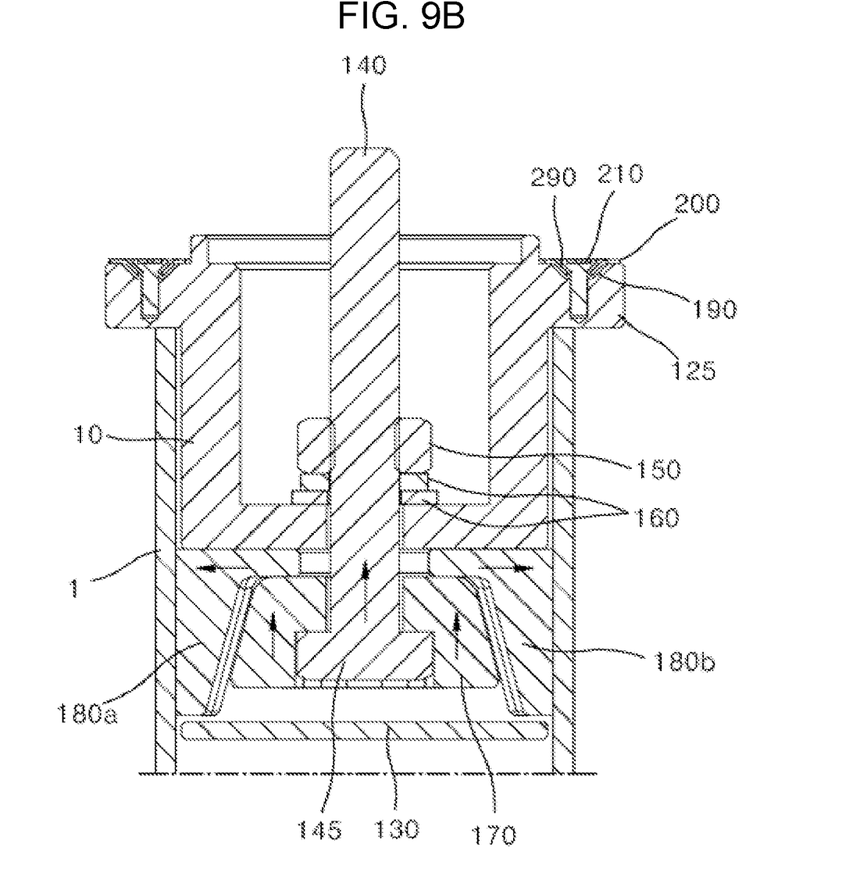

FIGS. 6A and 6B are exploded perspective views illustrating an external configuration and an internal configuration of the insertion-type clamping unit among the components illustrated in FIG. 3, FIG. 7 is a cut-away perspective view taken along line B-B in FIG. 3, FIG. 8 is a cut-away perspective view taken along line B-B in FIG. 3, i.e., an exploded perspective view of the configuration disposed outside the support pole, and FIGS. 9A and 9B are cross-sectional views illustrating states in which a locking pressing piece among the components of the insertion-type clamping unit illustrated in FIG. 3 operates.

As illustrated in FIGS. 6A to 9B, in the embodiment of the antenna clamping device according to the present invention, the insertion-type clamping unit 100 may include: the clamping body 110 fixedly inserted into and caught by an inner portion of the opened upper end of the support pole 1 and having a hollow internal space divided into the upper and lower spaces by a partition plate 120; the fixing bolt 140 provided to penetrate the internal space of the clamping body 110 in the upward/downward direction; and a pair of locking pressing pieces 180a and 180b configured to fix the clamping body 110 by pressing an inner peripheral surface of the support pole 1 in conjunction with a rotational operation of the fixing bolt 140.

As illustrated in FIGS. 6A to 9B, the clamping body 110 may be inserted into the inner peripheral surface of an upper-end opening portion 1a of the support pole 1 and have a tubular shape having an internal space. The internal space of the clamping body 110 may be divided into the upper space and the lower space by the partition plate 120.

An upper end of the clamping body 110 may have a catching flange 125 extending radially outward and having an outer diameter larger than an inner diameter of the upper end of the support pole 1. Therefore, the clamping body 110 may be inserted and seated in the upper-end opening portion 1a of the support pole 1 as the clamping body 110 is caught by a lower surface of the catching flange 125 and an upper-end surface of the support pole 1. In this case, an outer peripheral surface of the clamping body 110 may be disposed to be in close contact with or adjacent to the inner peripheral surface of the upper-end opening portion 1a of the support pole 1.

Further, a lower friction ring pad 200 may be further provided on the upper surface of the catching flange 125 formed at the upper end of the clamping body 110 and generate a frictional force with a part of a lower surface of the rear end 15 of the antenna clamping unit 10.

A plurality of screw fastening holes 190 is formed downward in an upper-end surface of the catching flange 125 of the clamping body 110, and a plurality of screw through-holes 290 is also penetratively formed in the lower friction ring pad 200 in the upward/downward direction. The lower friction ring pad 200 may be coupled as flat-head threaded members 210 penetrate the screw through-holes 290 from above to below the lower friction ring pad 200 and are fastened to the screw fastening holes 190 formed in the upper-end surface of the catching flange 125.

In addition, as illustrated in FIG. 1, an upper friction ring pad 20 may be fixedly fastened, by flat-head threaded members 21, to the lower surface of the rear end 15 of the coupling unit 13 among the components of the antenna clamping unit 10, more specifically, a lower surface of a peripheral portion of the mounting shaft 17, the upper friction ring pad 20 generating a frictional force by being in surface contact with the lower friction ring pad 200.

The upper friction ring pad 20 of the antenna clamping unit 10 and the lower friction ring pad 200 of the insertion-type clamping unit 110 may be in surface contact with each other and generate a predetermined frictional force, which makes it possible to prevent the sway caused by fine vibration transmitted from the outside (e.g., the sway caused by wind).

Meanwhile, the internal space of the clamping body 110 may be divided into the upper space positioned at the upper side thereof and the lower space positioned at the lower side thereof by the partition plate 120 integrally disposed horizontally in a middle portion thereof.

The upper space of the internal space of the clamping body 110 may be opened upward, and the lower space of the internal space thereof may be shielded by a lower plate 130. The upper and lower spaces of the clamping body 110 may communicate with each other through a fixing bolt through-hole (no reference numeral) penetrated by the fixing bolt 140.

In this case, the fixing bolt 140 may be disposed to penetrate the fixing bolt through-hole formed in the clamping body 110. The fixing bolt 140 may be disposed over the upper and lower spaces of the clamping body 110.

Further, the fixing bolt 140 may further include a fixing nut 150 fitted with an outer peripheral surface of the fixing bolt positioned in the upper space of the clamping body 110 and configured to rotate the fixing bolt 140 upward or downward over the upper and lower spaces of the clamping body 110 while rotating depending on a rotation direction of the fixing nut 150.

More specifically, the fixing nut 150 may be fitted with the outer peripheral surface of the fixing bolt positioned in the upper space. The fixing nut 150 may be supported by and fastened to an upper surface of the partition plate 120. In this case, a fixing washer 160 may be further interposed between the fixing nut 150 and the upper surface of the partition plate 120, thereby preventing the fixing bolt 140 from being arbitrarily loosened. For reference, if the fixing bolt 140 is arbitrarily loosened, the fixing bolt 140 may move downward. When the fixing bolt 140 moves downward, a fixing force of the clamping body 110, which is applied to the inner peripheral surface of the upper-end opening portion 1a of the support pole 1 by the locking pressing piece 180a and 180b to be described below, may be decreased.

Meanwhile, the clamping body 110 may have a pair of through portions 115 opened by cutting an outer peripheral surface of the clamping body 110 so that the pair of through portions 115 communicate with the lower space of the internal space. The pair of through portions 115 serve as passageways through which the pair of locking pressing pieces 180a and 180b positioned in the lower space of the internal space of the clamping body 110 moves in the horizontal direction and comes into contact with the inner peripheral surface of the support pole 1.

The insertion-type clamping unit 100 of the antenna clamping device according to the embodiment of the present invention may further include a lift piece 170 fitted with an outer periphery of a lower end of the fixing bolt 140 positioned in the lower space of the internal space of the clamping body 110. The lift piece 170 may operate in conjunction with the fixing bolt 140.

In this case, a bolt head portion 145 may be formed at a lower end of the fixing bolt 140 and has a relatively large diameter. The lift piece 170 may be supported by being caught upward by the bolt head portion 145 of the fixing bolt 140 positioned in the lower space of the internal space of the clamping body 110. Therefore, when the fixing bolt 140 is moved upward or downward in the internal space of the clamping body 110 by the fixing nut 150, the lift piece 170 may also move in the upward/downward direction while operating in conjunction with the fixing bolt 140.

The lift piece 170 may be positioned between the pair of locking pressing pieces 180a and 180b in the lower space of the internal space of the clamping body 110. One side of the lift piece 170 may be in contact with one 180a of the pair of locking pressing pieces 180a and 180b, and the other side of the lift piece 170 may be in contact with the other 180b of the pair of locking pressing pieces 180a and 180b. When the lift piece 170 moves in the upward/downward direction while operating in conjunction with the rotation of the fixing bolt 140 as described above, the lift piece 170 may move the respective locking pressing pieces 180a and 180b in the horizontal direction in the lower space.

To this end, an outer surface of the lift piece 170, which is in contact with the pair of locking pressing pieces 180a and 180b, may be inclined upward. Inner surfaces of the pair of locking pressing pieces 180a and 180b may be inclined in parallel with the outer surface of the lift piece 170. Therefore, when the lift piece 170 moves upward, the locking pressing piece 180a and 180b being in contact with the inclined outer surface of the lift piece 170 are pushed outward and pressed and brought into close contact with the inner peripheral surface of the upper-end opening portion 1a of the support pole 1. In this case, outer surfaces of the pair of locking pressing pieces 180a and 180b may be serrated to increase a contact force applied to the inner peripheral surface of the upper-end opening portion 1a of the support pole 1.

Meanwhile, the outer surfaces of the pair of locking pressing pieces 180a and 180b may be formed as curved surfaces parallel to the inner peripheral surface of the support pole 1. That is, the support pole 1 may be provided in the form of a circular hollow pipe, and the inner peripheral surface of the support pole 1 may be formed as a circular curved surface. The outer surfaces of the pair of locking pressing pieces 180a and 180b may correspond in shape to the inner peripheral surface of the support pole 1 to maximize contact areas of the pair of locking pressing pieces 180a and 180b.

The lift piece 170 may be provided to move in the upward/downward direction while operating in conjunction with the upward and downward movements of the fixing bolt 140. The lift piece 170 may be moved upward or downward by being guided by a pair of guide ribs 131 formed on the lower plate 130 positioned below the lift piece 170.

The pair of guide ribs 131 may be spaced apart from each other while corresponding to a spacing distance between approximately outer surfaces of two opposite ends of the outer surface of the lift piece 170 which are not in contact with the pair of locking pressing pieces 180a and 180b.

An operating process of the embodiment of the antenna clamping device according to the present invention configured as described above will be briefly described below with reference to the accompanying drawings (particularly, FIGS. 9A and 9B).

First, as illustrated in FIG. 9A, the insertion-type clamping unit 100 may be fixedly inserted into the upper-end opening portion 1a of the support pole 1.

Next, as illustrated in FIG. 9B, when the fixing bolt 140 is rotated upward in the internal space of the clamping body 110 by the rotation of the fixing nut 150 in a locking direction, the lift piece 170 fitted with the bolt head portion 145 of the fixing bolt 140 may be moved upward by being guided by the pair of guide ribs 131, and the pair of locking pressing pieces 180a and 180b may be pushed outward while penetrating the pair of through portions 115 by the upward movement of the lift piece 170. Further, the serrated outer surfaces of the pair of locking pressing pieces 180a and 180b may be brought securely into close contact with the inner peripheral surface of the support pole 1, such that the clamping body 110 may be fixed so as not to be arbitrarily separated from the support pole 1.

The embodiment of the antenna clamping device according to the present invention has been described as including the antenna clamping unit 10, the insertion-type clamping unit 100, and the support bracket unit 50. However, an embodiment in which the support bracket unit 50 is removed may be implemented. The embodiment in which the support bracket unit 50 is removed and only the antenna clamping unit 10 and the insertion-type clamping unit 100 are included may be defined as another embodiment of the antenna clamping device according to the present invention.

One and other embodiments of the antenna clamping device according to the present invention have been described above in detail with reference to the accompanying drawings. However, the present invention is not necessarily limited by one and other embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the antenna clamping device capable of being seated directly on the opened upper end of the support pole and securely fixed to the internal space of the upper end of the support pole without a separate fixing device.

The invention claimed is:

1. An antenna clamping device comprising:
   an antenna clamping unit having a tip portion on which an antenna device is mounted, the antenna clamping unit being configured to perform at least any one of a tilting rotation and a rotating rotation to set directionality of the antenna device and having a rear end fixedly inserted into an opened upper end of a support pole;
   an insertion-type clamping unit disposed inside the opened upper end of the support pole and configured to mediate the fixed insertion of the antenna clamping unit, the insertion-type clamping unit being pressed and fixed to an inner peripheral surface of the support pole; and
   a support bracket unit fixedly disposed on an outer peripheral surface of the support pole and configured to fixedly support a lower end of the antenna clamping unit.

2. The antenna clamping device of claim 1, wherein the insertion-type clamping unit comprises:
   a clamping body fixedly inserted into and caught by the opened upper end of the support pole and having a hollow internal space divided into an upper space and a lower space by a partition plate;
   a fixing bolt configured to penetrate the internal space of the clamping body in an upward/downward direction; and
   a pair of locking pressing pieces configured to fix the clamping body by pressing the inner peripheral surface of the support pole in conjunction with a rotational operation of the fixing bolt.

3. The antenna clamping device of claim 2, wherein the insertion-type clamping unit further comprises a fixing nut fitted with an outer peripheral surface of the fixing bolt and configured to rotate the fixing bolt over the upper and lower spaces of the clamping body upward or downward depending on a rotation direction thereof.

4. The antenna clamping device of claim 3, wherein the fixing nut is fitted with the outer peripheral surface of the fixing bolt positioned in the upper space, and the fixing nut is supported on and fastened to an upper surface of the partition plate.

5. The antenna clamping device of claim 2, wherein the pair of locking pressing pieces is positioned in the lower space of the internal space of the clamping body, and a pair of through portions is formed in the clamping body and opened so that the pair of locking pressing pieces moves in a horizontal direction and comes into contact with the inner peripheral surface of the support pole.

6. The antenna clamping device of claim 5, wherein outer surfaces of the pair of locking pressing pieces, which are in contact with the inner peripheral surface of the support pole, are serrated to increase a contact force.

7. The antenna clamping device of claim 2, wherein the insertion-type clamping unit further comprises a lift piece fitted with an outer periphery of a lower end of the fixing bolt positioned in the lower space of the internal space of the clamping body, the lift piece being configured to operate in conjunction with the fixing bolt.

8. The antenna clamping device of claim 7, wherein the lift piece is fitted with the outer periphery of the lower end of the fixing bolt positioned in the lower space of the internal space of the clamping body, and the lift piece is supported and caught by a bolt head portion having a diameter relatively larger than a diameter of the fixing bolt.

9. The antenna clamping device of claim 7, wherein an outer surface of the lift piece is inclined upward, inner surfaces of the pair of locking pressing pieces are inclined in parallel with the outer surface of the lift piece, and outer surfaces of the pair of locking pressing pieces are formed as curved surfaces parallel to the inner peripheral surface of the support pole.

10. The antenna clamping device of claim 7, wherein the lower space of the internal space of the clamping body is shielded by a lower plate, and a pair of guide ribs is provided on the lower plate and guides upward and downward movements of the lift piece that is moved upward or downward by a movement of the fixing bolt in the upward/downward direction.

11. The antenna clamping device of claim 10, wherein upper surfaces of the pair of locking pressing pieces are in close contact with a lower surface of the partition plate, lower surfaces of the pair of locking pressing pieces are supported on an upper surface of the lower plate, and the pair of locking pressing pieces is movable in a horizontal direction between the partition plate and the lower plate depending on an upward or downward movement of the lift piece.

12. The antenna clamping device of claim 2, wherein a catching flange is formed at an upper end of the clamping body and extends radially outward to have an outer diameter larger than an inner diameter of the upper end of the support pole, and a lower friction ring pad is further provided on an upper surface of the catching flange and generates a frictional force with a part of a lower surface of the rear end of the antenna clamping unit.

13. The antenna clamping device of claim 12, wherein an upper friction ring pad is further provided at the rear end of the antenna clamping unit and generates a frictional force while being in surface contact with the lower friction ring pad of the clamping body.

14. The antenna clamping device of claim 12, wherein a mounting shaft is provided at the rear end of the antenna clamping unit and has a mounting groove recessed downward, and the antenna clamping unit is fixed as the mounting shaft is inserted into the upper space of the internal space of the clamping body.

15. The antenna clamping device of claim 14, wherein an upper end of the fixing bolt is fastened inside the mounting groove by bolting while penetrating the mounting shaft.

16. The antenna clamping device of claim 1, wherein a bolting fastening portion is provided at the rear end of the antenna clamping unit and fastened to the support bracket unit by bolting.

17. The antenna clamping device of claim 16, wherein the support bracket unit comprises:
a fastening plate disposed at one outer peripheral side of the support pole and elongated in an upward/downward direction;
a U-shaped bolt configured to penetrate U-shaped bolt fastening holes formed in the fastening plate, the U-shaped bolt being coupled to the other outer periphery side of the support pole while surrounding the outer peripheral surface of the support pole; and
a close-contact plate extending upward from the fastening plate and being in close contact with the bolting fastening portion of the antenna clamping unit.

18. The antenna clamping device of claim 17, wherein the antenna clamping unit is fixed by at least one fixing bolt that penetrates the close-contact plate and is fastened to the bolting fastening portion.

19. The antenna clamping device of claim 17, wherein the fastening plate and the close-contact plate are positioned at a position at which the bolting fastening portion and the close-contact plate face each other when the antenna insertion-type clamping unit is inserted and supported in an internal space of the clamping body fixed to the upper end of the support pole.

20. An antenna clamping device comprising:
an antenna clamping unit having a tip portion on which an antenna device is mounted, the antenna clamping unit being configured to perform at least any one of a tilting rotation and a rotating rotation to set directionality of the antenna device and having a rear end inserted and fixed into an opened upper end of a support pole; and
an insertion-type clamping unit disposed inside the opened upper end of the support pole and configured to mediate the fixed insertion of the antenna clamping unit, the insertion-type clamping unit being pressed and fixed to an inner peripheral surface of the support pole,
wherein the insertion-type clamping unit comprises:
a clamping body fixedly inserted into and caught by the opened upper end of the support pole and having a hollow internal space divided into an upper space and a lower space by a partition plate;
a fixing bolt configured to penetrate the internal space of the clamping body in an upward/downward direction; and
a pair of locking pressing pieces configured to fix the clamping body by pressing the inner peripheral surface of the support pole in conjunction with a rotational operation of the fixing bolt.

* * * * *